(12) United States Patent
Lee et al.

(10) Patent No.: US 8,776,505 B2
(45) Date of Patent: Jul. 15, 2014

(54) METHOD FOR PREDICTING NOX AMOUNT AND EXHAUST SYSTEM USING THE SAME

(75) Inventors: Jin Ha Lee, Seoul (KR); Jin Woo Park, Suwon (KR); Christopher Severin, Aachen (DE); Thomas Wittka, Aachen (DE)

(73) Assignees: Hyundai Motor Company, Seoul (KR); Kia Motors Corporation, Seoul (KR); FEV Motorentechnik GmbH, Aachen (DE)

( * ) Notice: Subject to any disclaimer, the term of this patent is extended or adjusted under 35 U.S.C. 154(b) by 580 days.

(21) Appl. No.: 13/174,072

(22) Filed: Jun. 30, 2011

(65) Prior Publication Data

US 2012/0124973 A1    May 24, 2012

(30) Foreign Application Priority Data

Nov. 18, 2010 (KR) .................. 10-2010-0115239

(51) Int. Cl.
| | |
|---|---|
| *F01N 3/00* | (2006.01) |
| *F02D 41/00* | (2006.01) |
| *F01N 3/20* | (2006.01) |
| *F02D 41/14* | (2006.01) |
| *F01N 13/02* | (2010.01) |
| *F02D 41/02* | (2006.01) |
| *F02D 41/18* | (2006.01) |
| *F01N 3/035* | (2006.01) |

(52) U.S. Cl.
CPC ............ *F02D 41/0072* (2013.01); *Y02T 10/24* (2013.01); *F02D 2200/0414* (2013.01); *F01N 2610/02* (2013.01); *F02D 22/021* (2013.01); *F01N 13/02* (2013.01); *Y02T 10/47* (2013.01); *F02D 41/0225* (2013.01); *F01N 2240/30* (2013.01); *F02D 41/18* (2013.01); *F01N 2900/12* (2013.01); *F01N 29/1402* (2013.01); *F01N 3/208* (2013.01); *F02D 41/1462* (2013.01); *F01N 3/035* (2013.01); *F02D 2200/101* (2013.01); *F01N 2900/08* (2013.01)
USPC .................... 60/295; 60/274; 60/278; 60/301

(58) Field of Classification Search
CPC . F01N 2610/1453; F01N 3/10; F01N 3/0842; F01N 9/005; F01N 11/002; F01N 2560/026
USPC .................... 60/274, 278, 285, 286, 295, 301
See application file for complete search history.

(56) References Cited

U.S. PATENT DOCUMENTS

| | | | |
|---|---|---|---|
| 6,360,159 B1 * | 3/2002 | Miller et al. ................... | 701/103 |
| 8,301,356 B2 * | 10/2012 | Wang et al. .................... | 701/102 |
| 2003/0034018 A1 * | 2/2003 | Baldwin et al. ............... | 123/676 |

(Continued)

FOREIGN PATENT DOCUMENTS

JP            11-082097            3/1999

(Continued)

*Primary Examiner* — Thomas Denion
*Assistant Examiner* — Patrick Maines
(74) *Attorney, Agent, or Firm* — Morgan, Lewis & Bockius LLP (57) ABSTRACT

A method for predicting a NOx amount, may include determining a reference NOx amount according to a driving condition of an engine, primarily correcting the reference NOx amount according to an exhaust gas recirculation (EGR) ratio, and secondarily correcting the primarily corrected NOx amount according to an environmental factor and the driving condition.

15 Claims, 7 Drawing Sheets

(56) References Cited

U.S. PATENT DOCUMENTS

| | | | |
|---|---|---|---|
| 2008/0010973 A1* | 1/2008 | Gimbres | 60/276 |
| 2012/0053821 A1* | 3/2012 | Wolfe et al. | 701/105 |
| 2012/0253644 A1* | 10/2012 | Port | 701/109 |
| 2013/0054122 A1* | 2/2013 | Aoyagi | 701/104 |
| 2013/0085733 A1* | 4/2013 | Vartia et al. | 703/7 |

FOREIGN PATENT DOCUMENTS

| | | | | |
|---|---|---|---|---|
| JP | 2002-195026 | | 7/2002 | |
| JP | 2002371893 A | * | 12/2002 | F02D 41/14 |
| JP | 2003-314328 A | | 11/2003 | |
| JP | 2004019629 A | * | 1/2004 | F02D 45/00 |
| JP | 2004036557 A | * | 2/2004 | F02D 41/04 |
| JP | 2005-147106 | | 6/2005 | |
| JP | 2006-274905 A | | 10/2006 | |
| JP | 2006274905 A | * | 10/2006 | |
| JP | 2009150290 A | * | 7/2009 | |
| JP | 2009287410 A | * | 12/2009 | |
| JP | 2012107607 A | * | 6/2012 | |

* cited by examiner

METHOD FOR PREDICTING NOX AMOUNT AND EXHAUST SYSTEM USING THE SAME

CROSS-REFERENCE TO RELATED APPLICATION

The present application claims priority to Korean Patent Application No. 10-2010-0115239 filed in the Korean Intellectual Property Office on Nov. 18, 2010, the entire contents of which is incorporated herein for all purposes by this reference.

BACKGROUND OF THE INVENTION

1. Field of the Invention

The present invention relates to a method for predicting a NOx amount and an exhaust system using the same. More particularly, the present invention relates to a method for precisely predicting the NOx amount contained in an exhaust gas generated at an engine and to an exhaust system controlling supply of a reducing agent or combustion atmosphere according to the NOx amount.

2. Description of Related Art

Generally, exhaust gas flowing out through an exhaust manifold from an engine is driven into a catalytic converter mounted at an exhaust pipe and is purified therein. After that, the noise of the exhaust gas is decreased while passing through a muffler and then the exhaust gas is emitted into the air through a tail pipe. The catalytic converter purifies pollutants contained in the exhaust gas. In addition, a particulate filter for trapping particulate matters (PM) contained in the exhaust gas is mounted in the exhaust pipe.

A denitrification catalyst (DE-NOx catalyst) is one type of such a catalytic converter and purifies nitrogen oxide (NOx) contained in the exhaust gas. If reducing agents such as urea, ammonia, carbon monoxide, and hydrocarbon (HC) are supplied to the exhaust gas, the nitrogen oxide contained in the exhaust gas is reduced in the DE-NOx catalyst through oxidation-reduction reaction with the reducing agents.

Recently, a lean NOx trap (LNT) catalyst is used as such a DE-NOx catalyst. The LNT catalyst absorbs the nitrogen oxide contained in the exhaust gas when the engine operates in a lean atmosphere, and releases the absorbed nitrogen oxide when the engine operates in a rich atmosphere.

In addition, a selective catalytic reduction (SCR) catalyst may be used as the denitrification catalyst. In the SCR catalyst, the reducing agents such as carbon monoxide and total hydrocarbon (THC) react better with nitrogen oxide than oxygen. Thus, such a catalytic converter is called a selective catalytic reduction catalyst.

In a case that such the denitrification catalyst is used, an amount of the reducing agents supplied to the exhaust gas is determined according to a NOx amount contained in the exhaust gas generated at the engine. Therefore, it is very important to predict the NOx amount contained in the exhaust gas in order to improve purification efficiency.

A conventional method for predicting the NOx amount contained in the exhaust gas is to use a map in which the NOx amount generated at each driving condition of the engine is stored. That is, the NOx amount generated at each driving condition is calculated from the map at each time, and a total NOx amount contained in the exhaust gas is predicted by integrating the NOx amount at each time. Since the map, however, is made at a steady state of the engine, the NOx amount predicted based on the map is not correct at a transient state where the driving condition of the engine changes at each time. Particularly, since the engine operates at the transient state longer than at the steady state, a difference between an actual NOx amount and the predicted NOx amount is very large.

Another conventional method for predicting the NOx amount contained in the exhaust gas is to use a NOx sensor mounted at the exhaust pipe upstream of the denitrification catalyst. That is, the NOx amount is detected by the NOx sensor at each time, and the total NOx amount is predicted by integrating the NOx amount at each time. However, the NOx sensor operates normally only when a temperature of the exhaust gas is higher than a predetermined temperature. So, the NOx amount generated until the NOx sensor operates normally cannot be detected. Even if the NOx sensor is used, an error between the actual NOx amount and the detected NOx amount is very large.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to provide a method for predicting a NOx amount having advantages of predicting the NOx amount contained in an exhaust gas precisely by correcting the NOx amount calculated according to a driving condition of an engine from a map based on an EGR ratio and an environmental factor and to provide an exhaust system having advantages of improving purification efficiency of the NOx by controlling supply of a reducing agent or combustion atmosphere according to the predicted NOx amount.

In an aspect of the present invention, a method for predicting a NOx amount, may include determining a reference NOx amount according to a driving condition of an engine, primarily correcting the reference NOx amount according to an exhaust gas recirculation (EGR) ratio, and secondarily correcting the primarily corrected NOx amount according to an environmental factor and the driving condition.

Primary correction of the reference NOx amount according to the EGR ratio may include detecting an actual EGR ratio, determining the reference EGR ratio according to the driving condition of the engine, determining an EGR ratio deviation by subtracting the reference EGR ratio from the actual EGR ratio, and correcting the reference NOx amount according to the EGR ratio deviation.

Correction of the reference NOx amount according to the EGR ratio deviation may include determining a specific EGR ratio deviation by normalizing the EGR ratio deviation, determining an EGR coefficient according to the specific EGR ratio deviation, determining a reference NOx amount in an off state of EGR according to the driving condition of the engine, and correcting the reference NOx amount based on the reference NOx amount and the reference NOx amount in the off state of EGR according to the driving condition of the engine and the EGR coefficient by interpolation or extrapolation.

The reference NOx amount may be corrected by the interpolation when the specific EGR deviation may be smaller than a predetermined value, and the reference NOx amount may be corrected by the extrapolation when the specific EGR deviation may be larger than or equal to the predetermined value.

The driving condition of the engine may include a currently engaged gear step, an engine speed, and a current fuel injection amount.

The environmental factor may include a total air amount supplied into a combustion chamber of the engine, a temperature of an air supplied into the combustion chamber of the engine, and a coolant temperature.

Secondary correction of the primarily corrected NOx amount according to the environmental factor and the driving condition may include detecting a first correction coefficient according to a total air amount supplied into a combustion chamber of the engine, an engine speed, and a current fuel injection amount, and correcting the primarily corrected NOx amount according to the first correction coefficient.

Secondary correction of the primarily corrected NOx amount according to the environmental factor and the driving condition may include detecting a second correction coefficient according to an engine speed, a current fuel injection amount, and a coolant temperature, and correcting the primarily corrected NOx amount according to the second correction coefficient.

Secondary correction of the primarily corrected NOx amount according to the environmental factor and the driving condition may include detecting a third correction coefficient according to an engine speed, a current fuel injection amount, and a temperature of an air supplied into a combustion chamber of the engine, and correcting the primarily corrected NOx amount according to the third correction coefficient.

In another aspect of the present invention, an exhaust system may include an exhaust pipe through which an exhaust gas flows, the exhaust gas being generated at an engine having a first injector injecting a fuel into a combustion chamber, an injecting module mounted at the exhaust pipe and injecting a reducing agent, a denitrification catalyst mounted at the exhaust pipe downstream of the injecting module and reducing nitrogen oxide contained in the exhaust gas by using the reducing agent injected by the injecting module, and a control portion predicting NOx amount contained in the exhaust gas, and controlling supply of the reducing agent or combustion atmosphere according to the NOx amount, wherein the control portion determines a reference NOx amount according to a driving condition of the engine, and corrects the reference NOx amount according to an exhaust gas recirculation (EGR) ratio and an environmental factor.

The control portion may determine a reference EGR ratio and a reference NOx amount in an off state of an EGR according to the driving condition of the engine, detects an actual EGR ratio, and primarily corrects the reference NOx amount based on the reference EGR ratio, the actual EGR ratio, the reference NOx amount, and the reference NOx amount in the off state of the EGR by interpolation or extrapolation.

The control portion may secondarily correct the primarily corrected reference NOx amount by using first, second, and third correction coefficients according to the environmental factor, wherein the first correction coefficient may be determined based on a total air amount supplied into the combustion chamber of the engine, the engine speed, and the current fuel injection amount, wherein the second correction coefficient may be determined based on an engine speed, a current fuel injection amount, and a coolant temperature, and wherein the third correction coefficient may be determined based on an engine speed, a current fuel injection amount, and a temperature of an air supplied into the combustion chamber of the engine.

The reducing agent may be the fuel, and the injecting module may be a second injector.

The reducing agent may be urea or ammonia.

The combustion atmosphere may be controlled by controlling a ratio of the fuel to an air supplied into the combustion chamber of the engine.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the inventions) will be described in conjunction with exemplary embodiments, it will be understood that present description is not intended to limit the inventions) to those exemplary embodiments. On the contrary, the inventions) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

Figure 1:
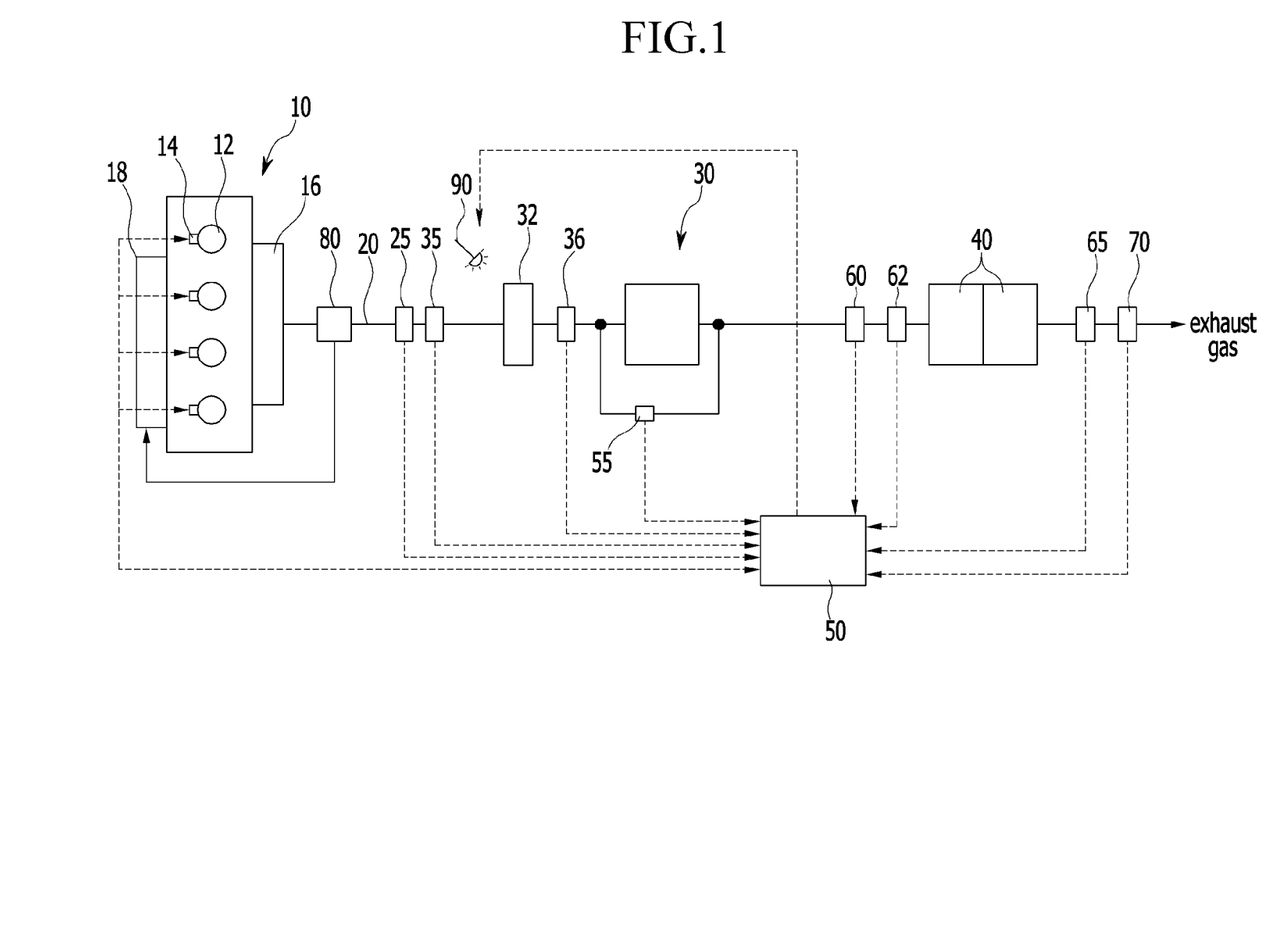
FIG. 1 is a schematic diagram of an exhaust system to which a method for predicting a NOx amount according to an exemplary embodiment of the present invention can be applied.

FIG. 1 is a schematic diagram of an exhaust system to which a method for predicting a NOx amount according to an exemplary embodiment of the present invention can be applied.

As shown in FIG. 1, an exhaust purification system for an internal combustion engine includes an engine 10, an exhaust pipe 20, an exhaust gas recirculation (EGR) apparatus 80, a fuel cracking catalyst 32, a particulate filter 30, a denitrification catalyst 40, and a control portion 50.

The engine 10 burns an air-fuel mixture in which fuel and air are mixed so as to convert chemical energy into mechanical energy. The engine 10 is connected to an intake manifold 18 so as to receive the air in a combustion chamber 12, and is connected to an exhaust manifold 16 such that exhaust gas generated in a combustion process is gathered in the exhaust manifold 16 and is exhausted to the exterior. A first injector 14 is mounted in the combustion chamber 12 so as to inject the fuel into the combustion chamber 12.

A diesel engine is exemplified herein, but a lean-burn gasoline engine may be used. In a case that the gasoline engine is used, the air-fuel mixture flows into the combustion chamber 12 through the intake manifold 18, and a spark plug is mounted at an upper portion of the combustion chamber 12.

In addition, an engine having various compression ratios, preferably a compression ration lower than or equal to 16.5, may be used.

The exhaust pipe 20 is connected to the exhaust manifold 16 so as to exhaust the exhaust gas to the exterior of a vehicle. The particulate filter 30 and the denitrification (DE-NOx) catalyst 40 are mounted at the exhaust pipe 20 so as to remove hydrocarbon, carbon monoxide, and nitrogen oxide contained in the exhaust gas.

The exhaust gas recirculation apparatus 80 is mounted at the exhaust pipe 20, and the exhaust gas exhausted from the engine 10 passes through the exhaust gas recirculation apparatus 80. In addition, the exhaust gas recirculation apparatus 80 is connected to the intake manifold 18 so as to control the combustion temperature by mixing a portion of the exhaust gas with the air. Such control of the combustion temperature is performed by controlling an amount of the exhaust gas supplied to the intake manifold 18 by control of the control portion 50.

A first oxygen sensor 25 is mounted at the exhaust pipe 20 downstream of the exhaust gas recirculation apparatus 80, and detects oxygen amount in the exhaust gas passing through the exhaust gas recirculation apparatus 80.

The second injector 90 is mounted at the exhaust pipe 20 downstream of the exhaust gas recirculation apparatus 80, is electrically connected to the control portion 50, and performs additional injection of fuel into the exhaust pipe 20 according to control of the control portion 50.

The particulate filter 30 is mounted at the exhaust pipe 20 downstream of the second injector 90. A fuel cracking catalyst is provided at upstream of the particulate filter 30. In this case, the fuel cracking catalyst 32 is disposed between the second injector 90 and the DE-NOx catalyst 40. Herein, the fuel cracking catalyst 32 is provided separately from the particulate filter 30, but the fuel cracking catalyst 32 may be coated at a front portion of the particulate filter 30.

Herein, the fuel cracking catalyst 32 is provided separately from the particulate filter 30, but the diesel fuel cracking catalyst 32 may be coated at a front portion of the particulate filter 30. That is, the fuel cracking catalyst 32 cuts the chain ring constituting hydrocarbon and decomposes the fuel through thermal cracking. Therefore, effective reaction area of the additionally injected fuel increases, and thereby hydrocarbon including high-reactivity oxygen (oxygenated HC), CO, and H2 are produced.

Thermal cracking proceeds as follows.
$C16H34 \rightarrow 2n\text{-}C8H17^* \rightarrow n\text{-}C6H13^* \rightarrow n\text{-}C4H9^* \rightarrow C2H5^* \rightarrow C2H4$
$C16H34 \rightarrow 8C2H4 + H2$ Here, * means a radical.

Herein, the hydrocarbon represents all compounds including carbon and hydrogen contained in the exhaust gas and the fuel.

A particulate matter filtering device 30 which is one type of the particulate filter 30 is mounted at downstream of the fuel cracking catalyst 32, and traps particulate matters (PM) contained in the exhaust gas exhausted through the exhaust pipe 20. In this specification, the particulate matter filtering device 30 and the particulate filter 30 are used for representing the same filter. However, other types of particulate filter 30 (e.g., catalyst particulate filter (CPF)) may be used instead of using the particulate matter filtering device 30.

In addition, an oxidizing catalyst may be coated at the particulate filter 30. Such an oxidizing catalyst oxidizes hydrocarbon and carbon monoxide contained in the exhaust gas into carbon dioxide, and oxidizes nitrogen monoxide contained in the exhaust gas into nitrogen dioxide. The oxidizing catalyst may be coated mainly at a specific region of the particulate filter 30 or may be coated uniformly at an entire region of the particulate filter 30.

A first temperature sensor 35 is mounted at the exhaust pipe 20 upstream of the fuel cracking catalyst 32, and detects an inlet temperature of the fuel cracking catalyst 32. A second temperature sensor 36 is mounted at downstream of the fuel cracking catalyst 32, and detects an outlet temperature of the fuel cracking catalyst 32 or an inlet temperature of the particulate filter 30.

Meanwhile, a pressure difference sensor 55 is mounted at the exhaust pipe 20. The pressure difference sensor 55 detects a pressure difference between an inlet and an outlet of the particulate filter 30, and transmits a signal corresponding thereto to the control portion 50. The control portion 50 controls the particulate filter 30 to be regenerated when the pressure difference detected by the pressure difference sensor 55 is higher than or equal to a first predetermined pressure. In this case, the first injector 14 can post-inject fuel so as to burn the particulate matters trapped in the particulate filter 30. On the contrary, the second injector 90 can additionally inject the fuel so as to regenerate the particulate filter 30.

The DE-NOx catalyst 40 is mounted at the exhaust pipe 20 downstream of the particulate filter 30. The DE-NOx catalyst 40 adsorbs the nitrogen oxide contained in the exhaust gas, and releases the adsorbed nitrogen oxide by the additional injection of the fuel. In addition, the DE-NOx catalyst 40 performs a reduction reaction of the released nitrogen oxide so as to purify the nitrogen oxide contained in the exhaust gas.

A third temperature sensor 60 and a fourth temperature sensor 65 are mounted respectively at upstream and downstream of the DE-NOx catalyst 40 so as to detect an inlet temperature and an outlet temperature of the DE-NOx catalyst 40. Herein, the DE-NOx catalyst 40 is divided into two parts. Why the DE-NOx catalyst 40 is divided into two parts is that metal ratio coated at each part may be changed so as to perform a specific function. For example, heat-resisting ability of a first part 40 close to the engine 10 is strengthened by increasing palladium (Pd) ratio, and slip of hydrocarbon at a second part 40 is prevented by increasing platinum (Pt) ratio. On the contrary, the DE-NOx catalyst 40 in which the same metal ratio is coated at an entire region thereof may be used.

In addition, a second oxygen sensor 62 is mounted at the exhaust pipe 20 upstream of the denitrification catalyst 40, and a third oxygen sensor 70 is mounted at the exhaust pipe 20 downstream of the denitrification catalyst 40. The second oxygen sensor 62 detects oxygen amount contained in the exhaust gas flowing in the denitrification catalyst 40 and transmits a signal corresponding thereto to the control portion 50 so as to help the control portion 50 perform lean/rich control of the exhaust gas. In addition, the third oxygen sensor 70 is used for monitoring whether the exhaust purification system for an internal combustion engine according to an exemplary embodiment of the present invention normally purifies noxious materials contained in the exhaust gas. Herein, it is exemplary described in this specification that the second oxygen sensor 62 is additionally mounted at the exhaust pipe 20. However, instead of additionally mounting the second oxygen sensor 62 at the exhaust pipe 20, the oxygen amount contained in the exhaust gas flowing in the denitrification catalyst 40 may be estimated based on at least one of detected values of the first oxygen sensor 25 and the third oxygen sensor 70, fuel consumption, and engine operating history.

The control portion 50 determines a driving condition of the engine based on signals transmitted from each sensor, and controls additional injection amount and additional injection timing of the fuel based on the driving condition of the engine. Thereby, the control portion 50 controls the denitrification catalyst 40 to release the adsorbed nitrogen oxide. For example, in a case that nitrogen oxide amount adsorbed in the denitrification catalyst 40 is larger than or equal to a predetermined value, the control portion 50 controls the fuel to be additionally injected.

In addition, the control portion 50 controls a ratio of the hydrocarbon to the nitrogen oxide in the exhaust gas to be larger than or equal to a predetermined ratio so as to activate reduction reaction of the nitrogen oxide in the denitrification catalyst 40. The predetermined ratio may be 5.

Meanwhile, the control portion 50 calculates the nitrogen oxide amount adsorbed in the denitrification catalyst 40, slip amount of the nitrogen oxide at a rear portion of the denitrification catalyst 40, and the ratio of the hydrocarbon to the nitrogen oxide based on the driving condition of the engine. Such calculation is done according to a map table defined by various experiments.

In addition, the control portion 50 changes injection pattern of the fuel by the second injector 90 according to the driving condition of the engine, state of the engine, or state of the denitrification catalyst 40. Here, the state of the engine is assumed by considering operating period of the engine, and the state of the denitrification catalyst 40 is assumed by considering degradation of the denitrification catalyst 40.

Further, the control portion 50 performs the regeneration of the particulate filter 30.

Meanwhile, the control portion 50 may control the first injector 14 to post-inject the fuel so as to activate the reduction reaction of the nitrogen oxide in the denitrification catalyst 40 instead of additional injection of the second injector 90. In this case, the post-injected fuel is converted into high-reactivity reducing agent at the fuel cracking catalyst 32, and promotes the reduction reaction of the nitrogen oxide in the denitrification catalyst 40. Therefore, it is to be understood that the additional injection includes the post-injection in this specification and claim sets.

In this specification, it is exemplifies that an LNT catalyst is used as the denitrification catalyst 40. However, an SCR catalyst may be used as the denitrification catalyst 40. In this case, an injecting device for injecting the reducing agent into the exhaust gas is mounted at the exhaust pipe 20 between the particulate filter 30 and the denitrification catalyst 40, and the control portion 50 controls supply of the reducing agent according to the NOx amount contained in the exhaust gas. In addition, the reducing agent may be urea or ammonia.

Hereinafter, one example of the denitrification catalyst 40 will be described in detail.

The denitrification catalyst 40 includes first and second catalyst layers coated on a carrier. The first catalyst layer is disposed close to the exhaust gas, and the second catalyst layer is disposed close to the carrier.

The first catalyst layer oxidizes the nitrogen oxide contained in the exhaust gas, and reduces a portion of the oxidized nitrogen oxide through oxidation-reduction reaction with the hydrocarbon contained in the unburned fuel or the exhaust gas. In addition, the remaining portion of the oxidized nitrogen oxide is diffused into the second catalyst layer.

The second catalyst layer adsorbs the nitrogen oxide diffused from the first catalyst layer, and releases the adsorbed nitrogen oxide by additionally injected fuel such that the adsorbed nitrogen oxide is reduced at the first catalyst layer.

The second catalyst layer includes an adsorption material. Weak alkaline oxides are used as such an adsorption material.

Hereinafter, operation of the denitrification catalyst 40 will be described in detail.

In a case that the fuel is not additionally injected from the second injector 90, the nitrogen oxide contained in the exhaust gas is oxidized in the first catalyst layer. A portion of the oxidized nitrogen oxide is reduced into nitrogen gas through the oxidation-reduction reaction with the hydrocarbon contained in the exhaust gas. At this stage, the hydrocarbon contained in the exhaust gas is oxidized into carbon dioxide.

In addition, the remaining portion of the oxidized nitrogen oxide and the nitrogen oxide contained in the exhaust gas are diffused into the second catalyst layer and are adsorbed therein.

In a case that the fuel is additionally injected from the second injector 90, the additionally injected fuel passes through the fuel cracking catalyst, and the fuel is converted into the hydrocarbon of the low molecule at this time. In addition, the portion of the hydrocarbon of the low molecule is converted into the oxygenated hydrocarbon and passes through the denitrification catalyst 40.

At this time, the nitrogen oxide is released from the second catalyst layer through the substituted reaction with the hydrocarbon. In addition, the nitrogen oxide is reduced into the nitrogen gas and the hydrocarbon and the oxygenated hydrocarbon are oxidized into the carbon dioxide in the first catalyst layer through the oxidation-reduction reaction of the released nitrogen oxide with the hydrocarbon and the oxygenated hydrocarbon.

Therefore, the nitrogen oxide and the hydrocarbon contained in the exhaust gas are purified.

Figure 2:
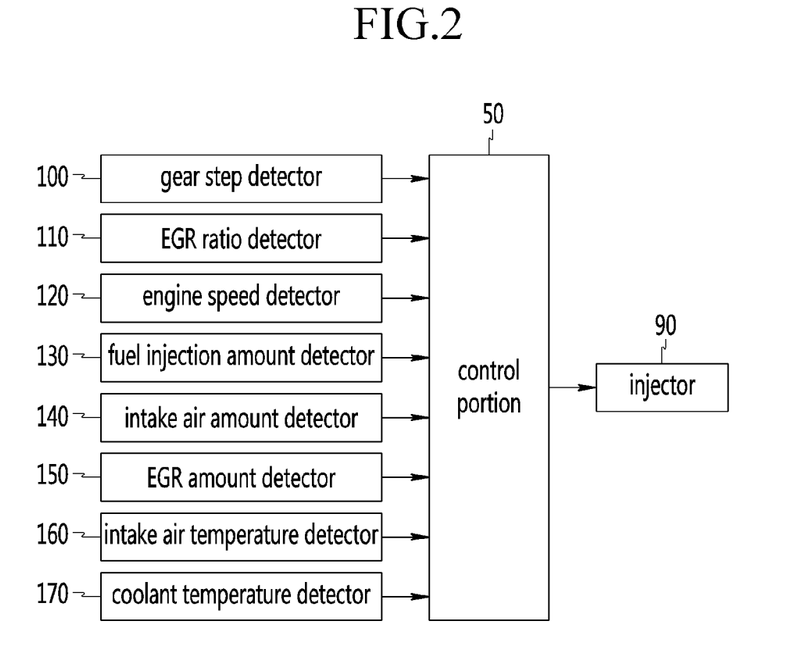
FIG. 2 is a block diagram showing a relationship of an input and output of a control portion used in a method for predicting a NOx amount according to an exemplary embodiment of the present invention.

FIG. 2 is a block diagram showing a relationship of an input and output of a control portion used in a method for predicting a NOx amount according to an exemplary embodiment of the present invention.

As shown in FIG. 2, a gear step detector 100, an EGR ratio detector 110, an engine speed detector 120, a fuel injection amount detector 130, an intake air amount detector 140, an EGR amount detector 150, an intake air temperature detector 160, and a coolant temperature detector 170 are electrically connected to the control portion 50, and detected values thereof is transmitted to the control portion 50.

The gear step detector 100 detects a currently engaged gear step.

The EGR ratio detector detects an actual EGR ratio (i.e., a ratio of an EGR amount to an intake air amount). Because the control portion 50 duty-controls an EGR valve, the EGR ratio can be detected by reading a current duty value.

The engine speed detector 120 detects an engine speed from a phase change of a crankshaft.

The fuel injection amount detector 130 detects a fuel injection amount which is currently supplied to the combustion chamber 12. Recently, the fuel is injected by a main injection and a pilot injection. Therefore, the fuel injection amount detector 130 detects a main injection amount and a pilot injection amount supplied to the combustion chamber 12 during a cycle. In addition, because the fuel injection amount is duty-controlled by the control portion 50, the current fuel injection amount can be detected by reading a current duty value.

The intake air amount detector 140 detects an air amount passing through an intake pathway.

The EGR amount detector 150 detects a gas amount which is recirculated. The EGR amount can be calculated from the intake air amount and the EGR ratio.

The intake air temperature detector 160 is mounted at the intake pathway and detects a temperature of the intake air.

The coolant temperature detector 170 detects a coolant temperature.

The control portion 50 determines the driving condition of the engine, the additional injection amount and the additional injection timing of the fuel, and the additional injection pattern based on the detected values, and outputs a signal for controlling the second injector 90 to the second injector 90. In addition, the control portion 50 controls the regeneration of the particulate filter 30 based on a value detected by the pressure difference sensor 55. As described above, the regeneration of the particulate filter 30 is performed by the post-injection of the first injector 14 or the additional injection of the second injector 90. Further, the control portion 50 detects a reference NOx amount contained in the exhaust gas, corrects the reference NOx amount according to the EGR ratio and an environmental factor, and controls the additional injection of the fuel or the supply of the reducing agent according to a final NOx amount.

Meanwhile, the exhaust system according to an exemplary embodiment of the present invention includes a plurality of sensors except the sensors shown in FIG. 2, but description therefore will be omitted for better comprehension and ease of description.

Figure 3:
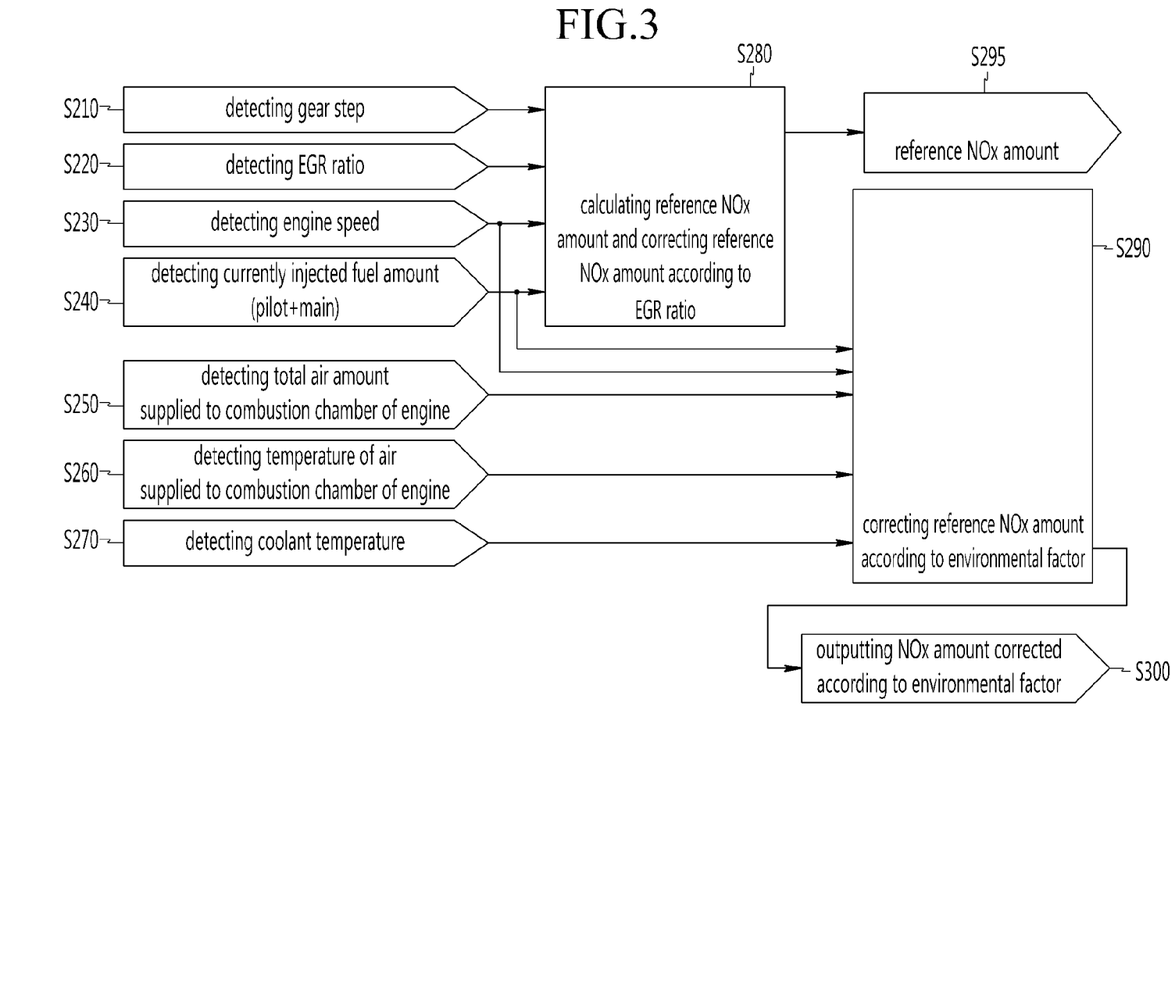
FIG. 3 is a flowchart of a method for predicting a NOx amount according to an exemplary embodiment of the present invention.
Figure 4:
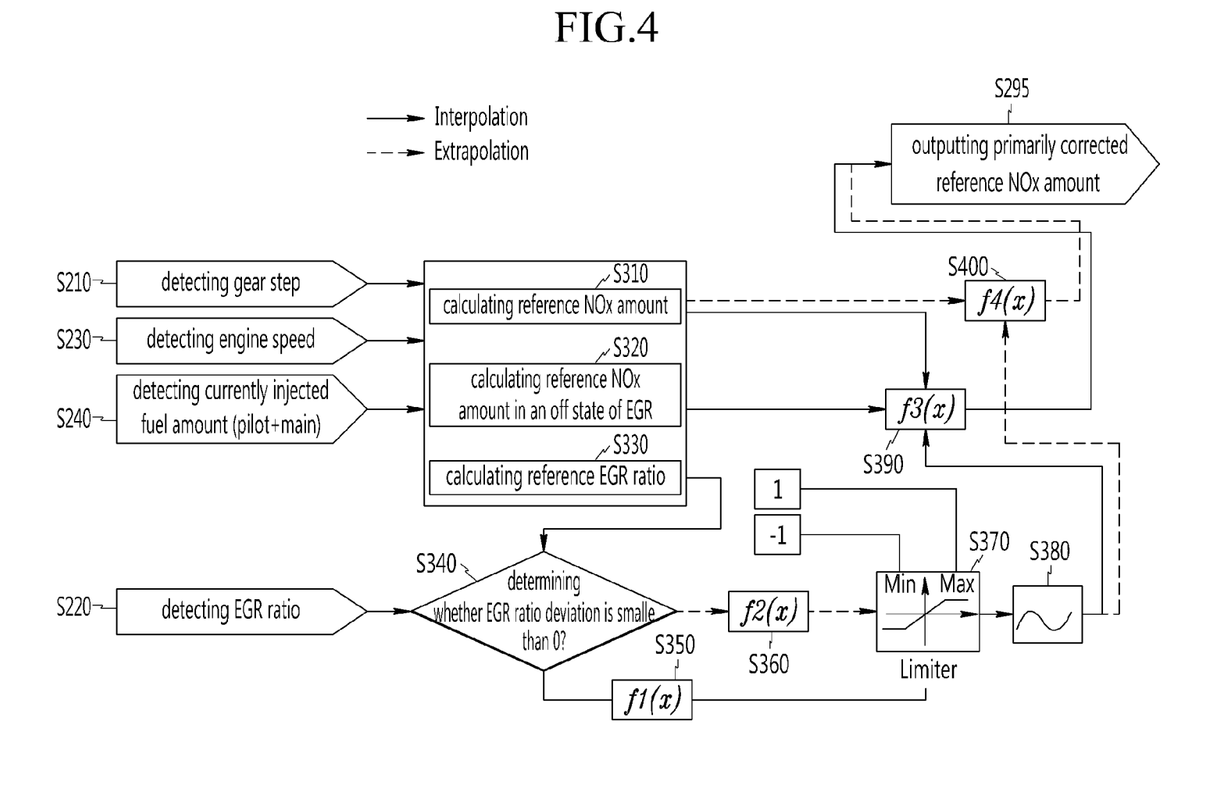
FIG. 4 is a flowchart of correcting a reference NOx amount primarily according to an EGR ratio in the method for predicting the NOx amount according to an exemplary embodiment of the present invention.
Figure 5:
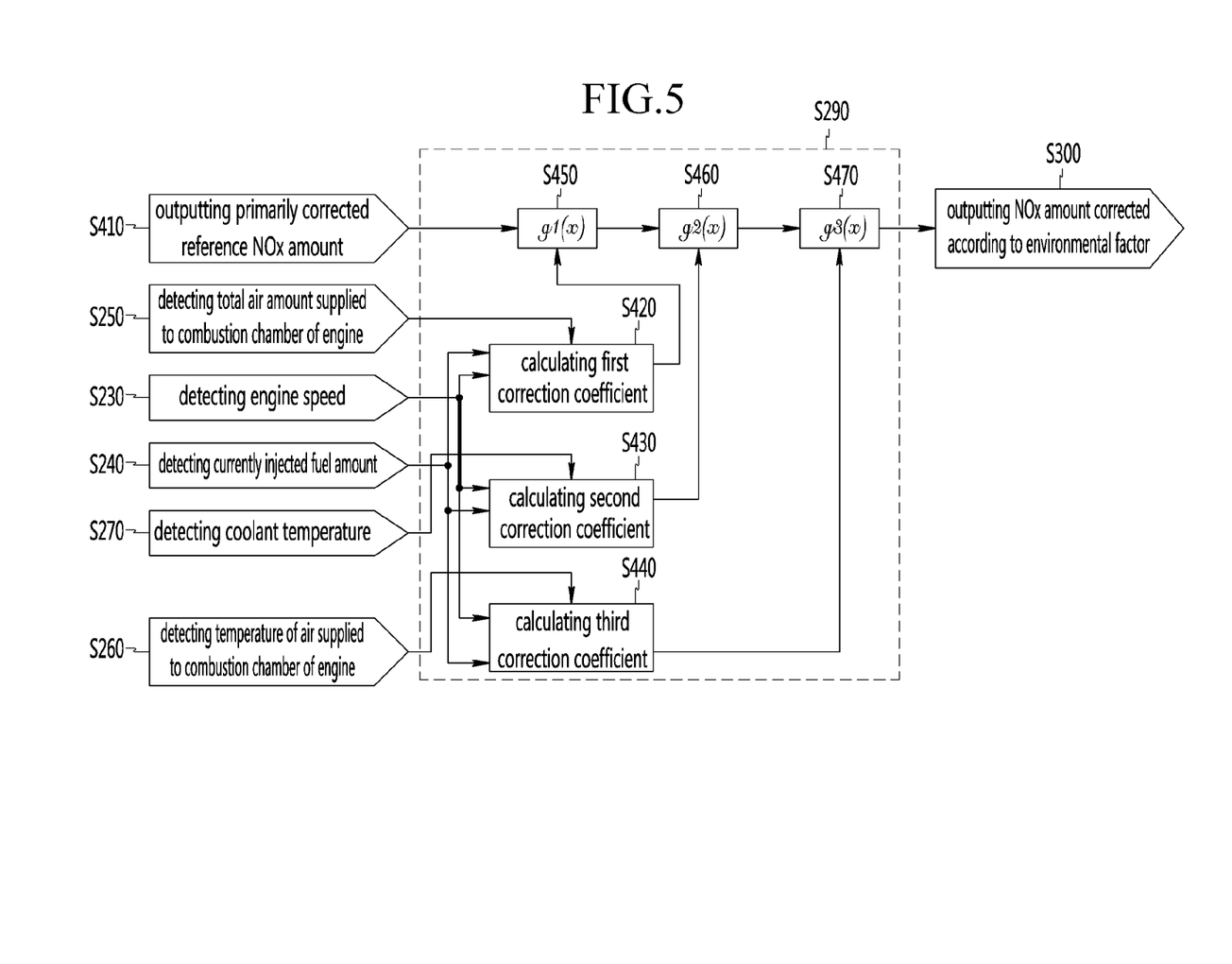
FIG. 5 is a flowchart of correcting the primarily corrected NOx amount secondarily according to an environmental factor in the method for predicting the NOx amount according to an exemplary embodiment of the present invention.

FIG. 3 is a flowchart of a method for predicting a NOx amount according to an exemplary embodiment of the present invention, FIG. 4 is a flowchart of correcting a reference NOx amount primarily according to an EGR ratio in the method for predicting the NOx amount according to an exemplary embodiment of the present invention, and FIG. 5 is a flowchart of correcting the primarily corrected NOx amount secondarily according to an environmental factor in the method for predicting the NOx amount according to an exemplary embodiment of the present invention.

The gear step detector 100 detects the gear step at a step S210, the EGR ratio detector 110 detects the actual EGR ratio at a step S220, the engine speed detector 120 detects the engine speed at a step S230, and the fuel injection amount detector 130 detects the currently injected fuel amount at a step S240. In addition, a total air amount supplied to the combustion chamber of the engine is detected by adding up the intake air amount detected by the intake air amount detector 140 and the EGR amount detected by the EGR amount detector 150 at a step S250, the intake air temperature detector 160 detects the temperature of the air supplied to the combustion chamber of the engine at a step S260, and the coolant temperature detector 170 detects the coolant temperature at a step S270.

The control portion 50 detects the reference NOx amount based on the detected values, primarily corrects the reference NOx amount according to the EGR ratio at a step S280, and secondarily corrects the primarily corrected reference NOx amount according to the environmental factor at a step S290. Primary correction of the reference NOx amount will be described in detail.

As shown in FIG. 4, the control portion 50 calculates the reference NOx amount according to the driving condition of the engine (the gear step, the engine speed, and the current fuel injection amount) at a step S310, calculates a reference NOx amount in an off state of the EGR (i.e., in a state that the EGR valve is closed) according to the driving condition of the engine at a step S320, and calculates a reference EGR ratio according to the driving condition of the engine at a step S330. The steps S310-S330 are performed by using a predetermined map. That is, the reference NOx amount, the reference NOx amount in the off state of the EGR, and the reference EGR ratio according to the driving condition of the engine are stored in the map. That is, the reference NOx amount, the reference NOx amount in the off state of the EGR, and the reference EGR ratio according to each driving condition of the engine are detected through experiments, and the detected values are stored in the map.

The control portion 50 calculates an EGR ratio deviation from the actual EGR ratio and the reference EGR ratio according to the driving condition of the engine, and determines whether the EGR ratio deviation is smaller than 0 at a step S340. The EGR ratio deviation is calculated by subtracting the reference EGR ratio from the actual EGR ratio.

If the EGR ratio deviation is smaller than 0, the reference NOx amount is corrected by interpolation. If the EGR ratio deviation, however, is larger than or equal to 0, the reference NOx amount is corrected by extrapolation. For these purposes, the EGR ratio deviation is normalized at steps S350 and S360.

That is, a specific EGR ratio deviation is calculated from [Equation 1] at the step S350.

$$\text{Specific EGR ratio deviation} = \text{EGR ratio deviation} / \text{reference EGR ratio} \quad \text{[Equation 1]}$$

In addition, the specific EGR ratio deviation is calculated from [Equation 2] at the step S360.

$$\text{Specific EGR ratio deviation} = \text{EGR ratio deviation} / (\text{maximum EGR ratio} - \text{reference EGR ratio}) \quad \text{[Equation 2]}$$

If the specific EGR ratio deviation is calculated at the steps S350 and S360, maximum and minimum values of the specific EGR ratio deviation are limited at a step S370. Herein, the maximum value may be 1 and the minimum value may be −1.

Figure 6:
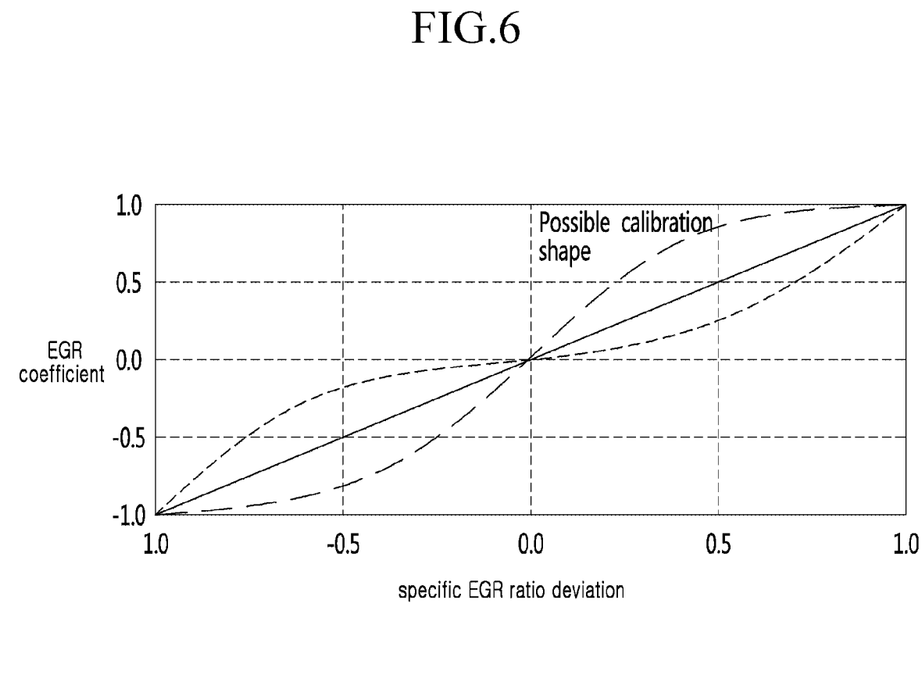
FIG. 6 is a graph showing an EGR coefficient to a specific EGR ratio deviation.

After that, the control portion 50 determines an EGR coefficient according to the specific EGR ratio deviation at a step S380. FIG. 6 is a graph showing an EGR coefficient to a specific EGR ratio deviation. FIG. 6 shows some exemplary relationships between the EGR coefficient and the EGR ratio deviation, and it is understood that the relationships between the EGR coefficient and the EGR ratio deviation are not limited to the relationships shown in FIG. 6.

Figure 7:
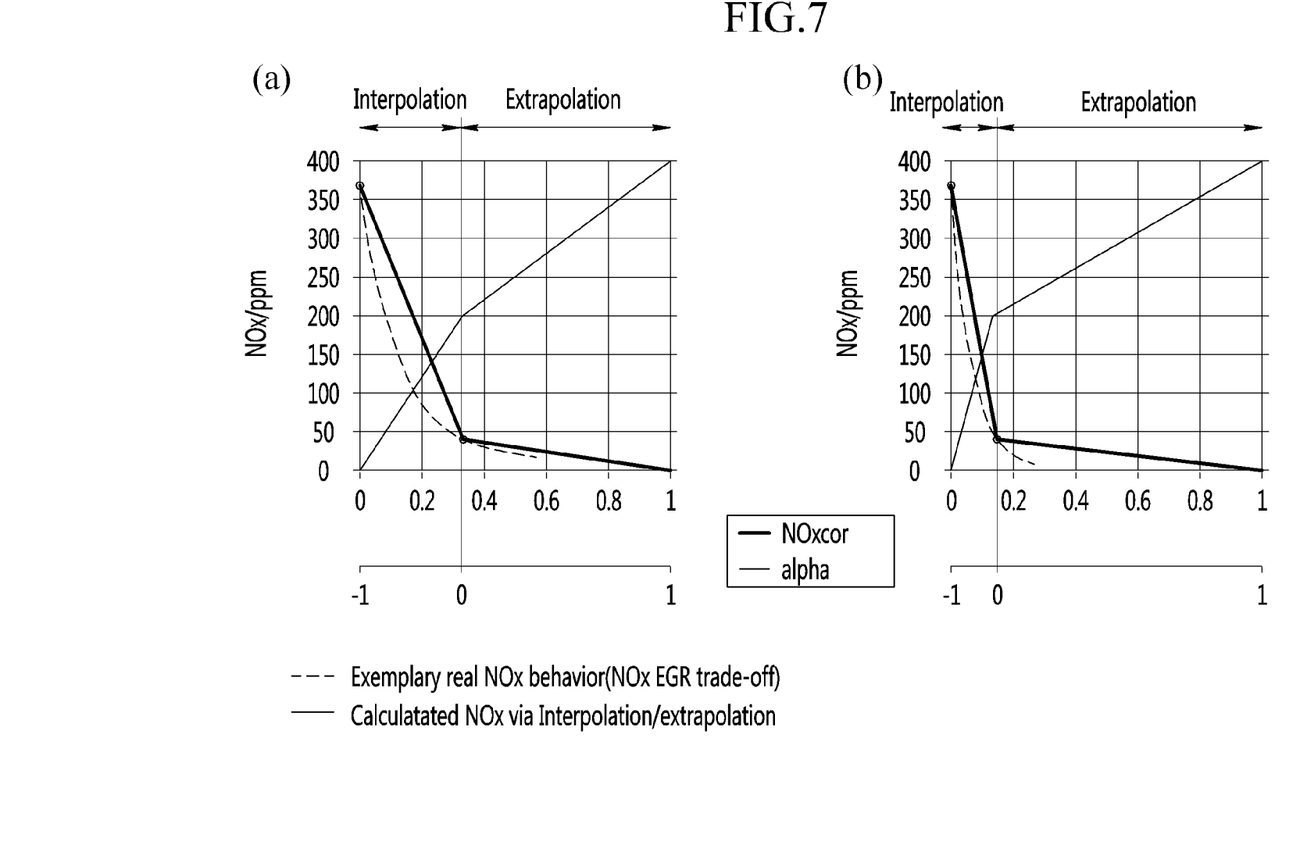
FIG. 7 is a graph showing that the NOx amount is primarily corrected according to the EGR ratio by applying an exemplary embodiment of the present invention.

After the EGR coefficient is determined, the control portion 50 primarily corrects the reference NOx amount by interpolation or extrapolation by using the EGR coefficient, the reference NOx amount in the off state of the EGR, and the reference NOx amount at steps S390 and S400. That is, if the EGR ratio deviation is smaller than 0, the reference NOx amount is corrected by the interpolation at the step S390. On the contrary, if the EGR ratio deviation is larger than or equal to 0, the reference NOx amount is corrected by the extrapolation at the step S400. FIG. 7 is a graph showing that the NOx amount is primarily corrected according to the EGR ratio by applying an exemplary embodiment of the present invention. A dotted line represents an actual NOx amount and a solid line represents the corrected reference NOx amount by the interpolation or the extrapolation in FIG. 7. In addition, FIG. 7 exemplarily shows that the reference NOx amount is corrected as a rectilinear shape by the interpolation or the extrapolation, but the correction of the reference NOx amount is not limited to this type. That is, the reference NOx amount can be corrected as a polynomial type.

The correction of the reference NOx amount by the interpolation or the extrapolation will be briefly described with reference to FIG. 7. Herein, it is exemplified that the EGR coefficient is the same as the specific EGR ratio deviation.

The NOx amount when the specific EGR ratio deviation is −1 represents the reference NOx amount in the off state of the EGR, and the NOx amount when the specific EGR ratio deviation is 0 represents the reference NOx amount. In order to obtain the NOx amount by the interpolation when the specific EGR ratio deviation is between −1 and 0, the reference NOx amount in the off state of the EGR and the reference NOx amount are connected in order to form a straight line. In addition, in order to obtain the NOx amount by the extrapolation when the specific EGR ratio deviation is between 0 and 1, the reference NOx amount and the NOx amount when the specific EGR ratio deviation is 1 (this value is 0 in FIG. 7) are connected in order to form a straight line. The reference NOx amount is corrected according to the actual EGR ratio by the interpolation or the extrapolation described above.

After that, the control portion 50 outputs the primarily corrected reference NOx amount at a step S295, and secondarily corrects the primarily corrected reference NOx amount according to an environmental factor at the step S290.

As shown in FIG. 5, the control portion 50 calculates first, second, and third correction coefficients at steps S420, S430, and S440. The first correction coefficient is calculated based on the total air amount supplied into the combustion chamber of the engine, the engine speed, and the current fuel injection amount, the second correction coefficient is calculated based on the engine speed, the current fuel injection amount, and the coolant temperature, and the third correction coefficient is calculated based on the engine speed, the current fuel injection amount, and the temperature of the air supplied into the combustion chamber of the engine. The first, second, and third correction coefficients may be obtained from a predetermined map.

After that, the control portion 50 corrects the reference NOx amount secondarily by using the primarily corrected reference NOx amount and the first, second, and third correction coefficients at steps S450, S460, and S470. Secondary correction of the reference NOx amount can be performed by multiplying the primarily corrected reference NOx amount and the first, second, and third correction coefficients.

Finally, the control portion 50 outputs the NOx amount corrected according to the environmental factor at a step S300.

If the NOx amount contained in the exhaust gas is predicted as described above, the control portion 50 controls the additional injection of the fuel or supply of the reducing agent according to the NOx amount. On the contrary, the control portion 50 may control combustion atmosphere by controlling the ratio of the fuel to the air supplied to the combustion chamber of the engine according to the NOx amount.

As described above, because the NOx amount contained in the exhaust gas can be precisely predicted according to an exemplary embodiment of the present invention, purification efficiency of the NOx can be improved.

Because supply of the reducing agent or combustion atmosphere is controlled according to an exact NOx amount, fuel economy may be improved.

Because an additional sensor for predicting the NOx amount is not required, product cost may be reduced.

For convenience in explanation and accurate definition in the appended claims, the terms "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for predicting a NOx amount, comprising:
generating exhaust gas from an engine and passing the exhaust gas to an exhaust pipe;
determining a reference NOx amount contained in the exhaust gas according to a driving condition of an engine;
primarily correcting the reference NOx amount according to an exhaust gas recirculation (EGR) ratio;
secondarily correcting the primarily corrected NOx amount according to an environmental factor and the driving condition; and
wherein secondary correction of the primarily corrected NOx amount according to the environmental factor and the driving condition comprises:
detecting a first correction coefficient according to a total air amount supplied into a combustion chamber of the engine, an engine speed, and a current fuel injection amount and correcting the primarily corrected NOx amount according to the first correction coefficient.

2. The method of claim 1, wherein primary correction of the reference NOx amount according to the EGR ratio comprises:
detecting an actual EGR ratio;
determining the reference EGR ratio according to the driving condition of the engine;
determining an EGR ratio deviation by subtracting the reference EGR ratio from the actual EGR ratio; and
correcting the reference NOx amount according to the EGR ratio deviation.

3. The method of claim 2, wherein correction of the reference NOx amount according to the EGR ratio deviation comprises:
determining a specific EGR ratio deviation by normalizing the EGR ratio deviation;
determining an EGR coefficient according to the specific EGR ratio deviation;
determining a reference NOx amount in an off state of EGR according to the driving condition of the engine; and
correcting the reference NOx amount based on the reference NOx amount and the reference NOx amount in the off state of EGR according to the driving condition of the engine and the EGR coefficient by interpolation or extrapolation.

4. The method of claim 3, wherein the reference NOx amount is corrected by the interpolation when the specific EGR deviation is smaller than a predetermined value, and the reference NOx amount is corrected by the extrapolation when the specific EGR deviation is larger than or equal to the predetermined value.

5. The method of claim 1, wherein the driving condition of the engine comprises a currently engaged gear step, an engine speed, and a current fuel injection amount.

6. The method of claim 1, wherein the environmental factor includes a total air amount supplied into a combustion chamber of the engine, a temperature of an air supplied into the combustion chamber of the engine, and a coolant temperature.

7. The method of claim 1, wherein secondary correction of the primarily corrected NOx amount according to the environmental factor and the driving condition comprises:
   detecting a second correction coefficient according to an engine speed, a current fuel injection amount, and a coolant temperature; and
   correcting the primarily corrected NOx amount according to the second correction coefficient.

8. The method of claim 7, wherein secondary correction of the primarily corrected NOx amount according to the environmental factor and the driving condition comprises:
   detecting a third correction coefficient according to an engine speed, a current fuel injection amount, and a temperature of an air supplied into a combustion chamber of the engine; and
   correcting the primarily corrected NOx amount according to the third correction coefficient.

9. An exhaust system comprising:
   an exhaust pipe through which an exhaust gas flows, the exhaust gas being generated at an engine having a first injector injecting a fuel into a combustion chamber;
   a second injector mounted at the exhaust pipe and injecting a reducing agent;
   a denitrification catalyst mounted at the exhaust pipe downstream of the injecting module and reducing nitrogen oxide contained in the exhaust gas by using the reducing agent injected by the second injector; and
   a controller configured to predict an NOx amount contained in the exhaust gas, and control supply of the reducing agent or combustion atmosphere according to the NOx amount,
   wherein the controller determines a reference NOx amount according to a driving condition of the engine, and corrects the reference NOx amount according to an exhaust gas recirculation (EGR) ratio and an environmental factor;
   wherein the controller determines a reference EGR ratio and a reference NOx amount in an off state of an EGR according to the driving condition of the engine, detects an actual EGR ratio, and primarily corrects the reference NOx amount based on the reference EGR ratio, the actual EGR ratio, the reference NOx amount, and the reference NOx amount in the off state of the EGR by interpolation or extrapolation; and
   wherein the controller secondarily corrects the primarily corrected reference NOx amount by using first, second, and third correction coefficients according to the environmental factor and the first correction coefficient is determined based on a total air amount supplied into the combustion chamber of the engine, the engine speed, and the current fuel injection amount.

10. The exhaust system of claim 9, wherein the driving condition of the engine comprises a currently engaged gear step, an engine speed, and a current fuel injection amount.

11. The exhaust system of claim 9, wherein the second correction coefficient is determined based on an engine speed, a current fuel injection amount, and a coolant temperature.

12. The exhaust system of claim 11, wherein the third correction coefficient is determined based on an engine speed, a current fuel injection amount, and a temperature of an air supplied into the combustion chamber of the engine.

13. The exhaust system of claim 9, wherein the reducing agent is a fuel.

14. The exhaust system of claim 9, wherein the reducing agent is urea or ammonia.

15. The exhaust system of claim 9, wherein the combustion atmosphere is controlled by controlling a ratio of the fuel to an air supplied into the combustion chamber of the engine.

* * * * *